(12) United States Patent
Fuse et al.

(10) Patent No.: US 12,083,428 B2
(45) Date of Patent: Sep. 10, 2024

(54) INFORMATION PROCESSING DEVICE AND IMAGE DISPLAY METHOD

(71) Applicant: Sony Interactive Entertainment Inc., Tokyo (JP)

(72) Inventors: Atsushi Fuse, Tokyo (JP); Steven Trombetta, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 298 days.

(21) Appl. No.: 17/635,840

(22) PCT Filed: Aug. 13, 2020

(86) PCT No.: PCT/JP2020/030759
§ 371 (c)(1),
(2) Date: Feb. 16, 2022

(87) PCT Pub. No.: WO2021/033616
PCT Pub. Date: Feb. 25, 2021

(65) Prior Publication Data
US 2022/0305383 A1    Sep. 29, 2022

Related U.S. Application Data

(60) Provisional application No. 62/889,102, filed on Aug. 20, 2019.

(51) Int. Cl.
*A63F 13/533*    (2014.01)
*A63F 13/86*    (2014.01)
(Continued)

(52) U.S. Cl.
CPC ............ *A63F 13/533* (2014.09); *A63F 13/86* (2014.09); *G06F 3/0482* (2013.01); *G06T 11/00* (2013.01);
(Continued)

(58) Field of Classification Search
CPC .. A63F 13/533; A63F 13/86; A63F 2300/308; A63F 2300/577; A63F 13/48;
(Continued)

(56) References Cited

U.S. PATENT DOCUMENTS 9,986,001 B2   5/2018   Takaichi
10,272,345 B2   4/2019   Kobayashi
(Continued)

FOREIGN PATENT DOCUMENTS

JP    2014236866 A    12/2014
JP    2015002895 A    1/2015
(Continued)

OTHER PUBLICATIONS

Decision to Grant a Patent for corresponding JP Application No. JP2021-540748, 4 pages dated Oct. 24, 2023.
(Continued)

*Primary Examiner* — Pierre E Elisca
(74) *Attorney, Agent, or Firm* — Matthew B. Dernier, Esq.

(57) ABSTRACT

A game image display unit displays a game image. A system image display unit superimposes, onto the game image, and displays a system image according to an operation by a user. A selection area display unit displays an area for selection of participating, as a spectator, in a session for a multiplayer game.

6 Claims, 10 Drawing Sheets

(51) Int. Cl.
*G06F 3/0482* (2013.01)
*G06T 11/00* (2006.01)

(52) U.S. Cl.
CPC ... *A63F 2300/308* (2013.01); *A63F 2300/577* (2013.01); *G06T 2200/24* (2013.01)

(58) Field of Classification Search
CPC ...... A63F 13/537; A63F 13/837; A63F 13/35; G06F 3/0482; G06T 11/00; G06T 2200/24
USPC .......................................................... 463/31
See application file for complete search history.

(56) References Cited

U.S. PATENT DOCUMENTS

| | | | | |
|---|---|---|---|---|
| 10,722,802 | B2* | 7/2020 | Hingorani | A63F 13/2145 |
| 2008/0254881 | A1* | 10/2008 | Lutnick | G07F 17/3293 |
| | | | | 463/31 |
| 2009/0093300 | A1* | 4/2009 | Lutnick | G07F 17/3293 |
| | | | | 463/31 |
| 2010/0048302 | A1* | 2/2010 | Lutnick | G07F 17/3218 |
| | | | | 463/42 |
| 2011/0065490 | A1* | 3/2011 | Lutnick | G07F 17/3223 |
| | | | | 463/16 |
| 2015/0281296 | A1 | 10/2015 | Takaichi | |
| 2016/0121223 | A1 | 5/2016 | Kobayashi | |
| 2018/0214777 | A1* | 8/2018 | Hingorani | A63F 13/5255 |
| 2019/0104235 | A1* | 4/2019 | Sarkar | H04N 21/47 |
| 2019/0217205 | A1* | 7/2019 | Atli | A63F 13/424 |

FOREIGN PATENT DOCUMENTS

| | | |
|---|---|---|
| JP | 2015171454 A | 10/2015 |
| JP | 2017104573 A | 6/2017 |
| JP | 2019118786 A | 7/2019 |

OTHER PUBLICATIONS

Notice of Reasons for Refusal for corresponding JP Application No. JP2021-540748, 8 pages dated Mar. 16, 2023.

[Postscript : 11 / 18]15th "formal Nico-Nico-Live" 11 / 18 (water) broadcast determination ! A monster strike official site [online], https://www.monster-strike.com/news/20151111_2.html, 6 pages, dated Nov. 18, 2015 (for relevancy see Non. Pat. Lit. #1).

STEAM Group The Japanese Gauntlet multi-play part JGMPSTEAM [online] https://steamcommunity.com/groups/gauntletjapan/discussions/0/49687986590115265, 2 pages, dated Oct. 30, 2015 (for relevancy see Non. Pat. Lit. #1).

International Search Report for corresponding Application PCT/2020/030759, 4 pages, dated Oct. 27, 2020.

Notice of Reasons for Refusal for corresponding JP Application No. JP2021-540748, 8 pages dated Aug. 14, 2023.

Room page, Online Manual Gran Turismo Sport, and world web archive National Diet Library, on the Collection of Internet Material Collection, https://web.archive.org/web/20190726164432/http://www.granturismo.com/jp/gt6/manual/#!/onlinerace/lounge., 4 pages, Jan. 26, 2007 (for relevancy see Non-Pat. Lit. #1).

* cited by examiner

INFORMATION PROCESSING DEVICE AND IMAGE DISPLAY METHOD

TECHNICAL FIELD

The present disclosure relates to a technology for superimposing a system image generated by system software onto a game image and for displaying the resulting image.

BACKGROUND ART

PTL 1 discloses a technology for displaying an invitation message to a game session onto a display. In the technology disclosed in PTL 1, a valid invitation message and an invalid invitation message are displayed in respective different modes.

CITATION LIST

Patent Literature

[PTL 1] U.S. Patent Application Publication No. 2016/121223

SUMMARY

Technical Problem

A user who has received an invitation message to a game from a friend will activate and participate in the game as a player, upon accepting the invitation. Under the current circumstances regarding modes of participation in a game via system software, there exists no choice other than participating as a player.

Solution to Problem

To solve the above problem, an information processing device according to a mode of the present disclosure includes a game image display unit configured to display a game image, and a system image display unit configured to superimpose, onto the game image, and display a system image according to an operation by a user. The system image display unit includes a selection area display unit configured to display an area for selection of participating, as a spectator, in a session for a multiplayer game.

An image display method according to another mode of the present disclosure is a method for superimposing, onto a game image, and displaying another image. The method includes a step of displaying the game image, a step of superimposing, onto the game image, and displaying a window including information regarding a session for a multiplayer game, and a step of displaying an area for selection of participating in the session as a spectator.

Note that optional combinations of the abovementioned constituting elements and implementations of the disclosure in the form of methods, apparatuses, systems, recording media, and computer programs may also be practiced as additional modes of the present disclosure.

DESCRIPTION OF EMBODIMENTS

Figure 1:
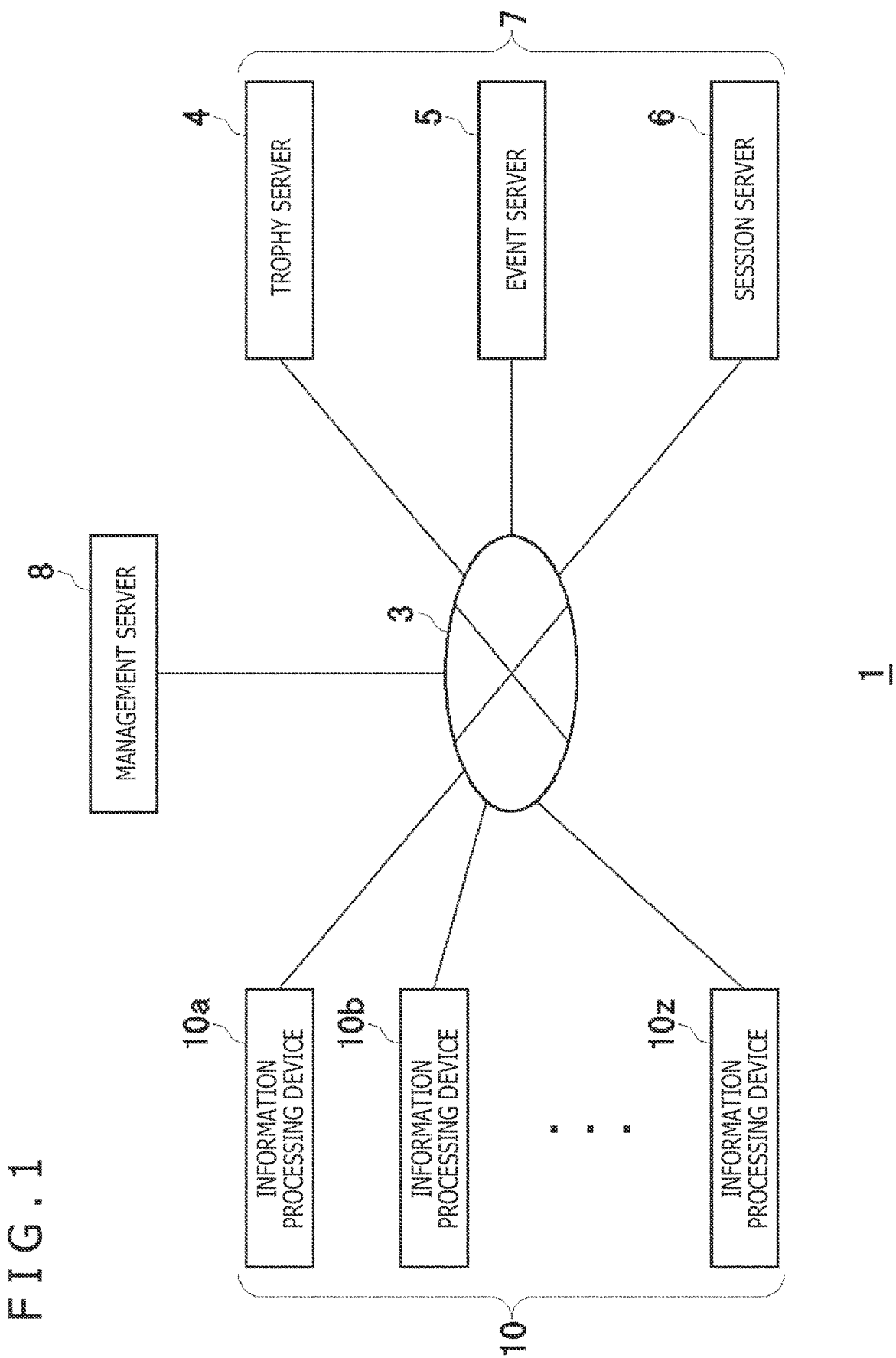
FIG. 1 depicts a diagram illustrating an information processing system according to an embodiment.

FIG. 1 depicts an information processing system 1 according to an embodiment. The information processing system 1 includes multiple types of activity servers 7 that includes a trophy server 4, an event server 5, and a session server 6, a management server 8, and a plurality of information processing devices 10a to 10z (hereinafter, referred to as "information processing devices 10" unless otherwise distinguished). In the information processing system 1, the various types of activity servers 7, the management server 8, and the information processing devices 10 are communicably coupled to each other via a network 3 such as the Internet.

The information processing device 10 may be a game device that has system software and executes a game program. A user of the information processing device 10 operates an input device such as a game controller, thereby inputting operation information of a game. With the information processing system 1, the user has identification information (user ID (Identification)) for uniquely identifying himself or herself. The user signs in to the management server 8 so as to sign in to services provided by the management server 8 and the various activity servers 7, thereby using the various services.

Upon occurrence of an event in the game, the game program according to the embodiment outputs, to the system software, event information that contains an event code to identify the occurred event. Such an event is set to occur when the progress of playing the game changes or when the behavior of player character and game character changes. The system software transmits the output event information together with the user ID to the activity servers 7 and/or the management server 8.

The activity servers 7 manage the activity of the user. The activity of the user includes an action of the user in the game, an outcome resulted from the action, and the state of the user in the game and the session. In the embodiment, although the activity servers 7 include the trophy server 4, the event server 5, and the session server 6, there may exist activity servers 7 of other types.

The trophy server 4 manages the user's status of winning trophies and the status of progress toward winning trophies. Various missions are set in the game. When a mission is cleared, the user wins a trophy, a virtual award for clearing the mission. Since the mission clearing condition is a play condition for releasing a trophy to the user, the mission clearing condition is also called an "unlock condition" of the trophy. The information processing device 10, when determining that the unlock condition is satisfied, transmits the result of the determination to the trophy server 4. The information processing device 10 may transmit, to the trophy server 4, the event information relating to the satisfaction of the unlock condition. With this configuration, the trophy server 4 manages the activity of user that includes the user's status of winning trophies and the status of progress toward winning trophies.

The event server 5 manages the user's status of playing the game. The information processing device 10 transmits, to the event server 5, the event information output from the game. The event server 5 acquires and stores the event information on a time-series basis, and manages the activity of user which includes the status of progress of playing the game.

The session server 6 manages the state of a session created by the game. The session server 6 manages information, regarding the session crated by the game, that includes the title of the game being played, the user ID of the member (session leader) who has created the session, the user ID of the member participating in the session, the length of a period for the session, the number of open slots of the session, and the like. The information processing device 10 transmits, to the session server 6, the event information regarding the session, with the event information output from the game. In this way, the session server 6 manages the activities of users which include the state of the session.

Figure 2:
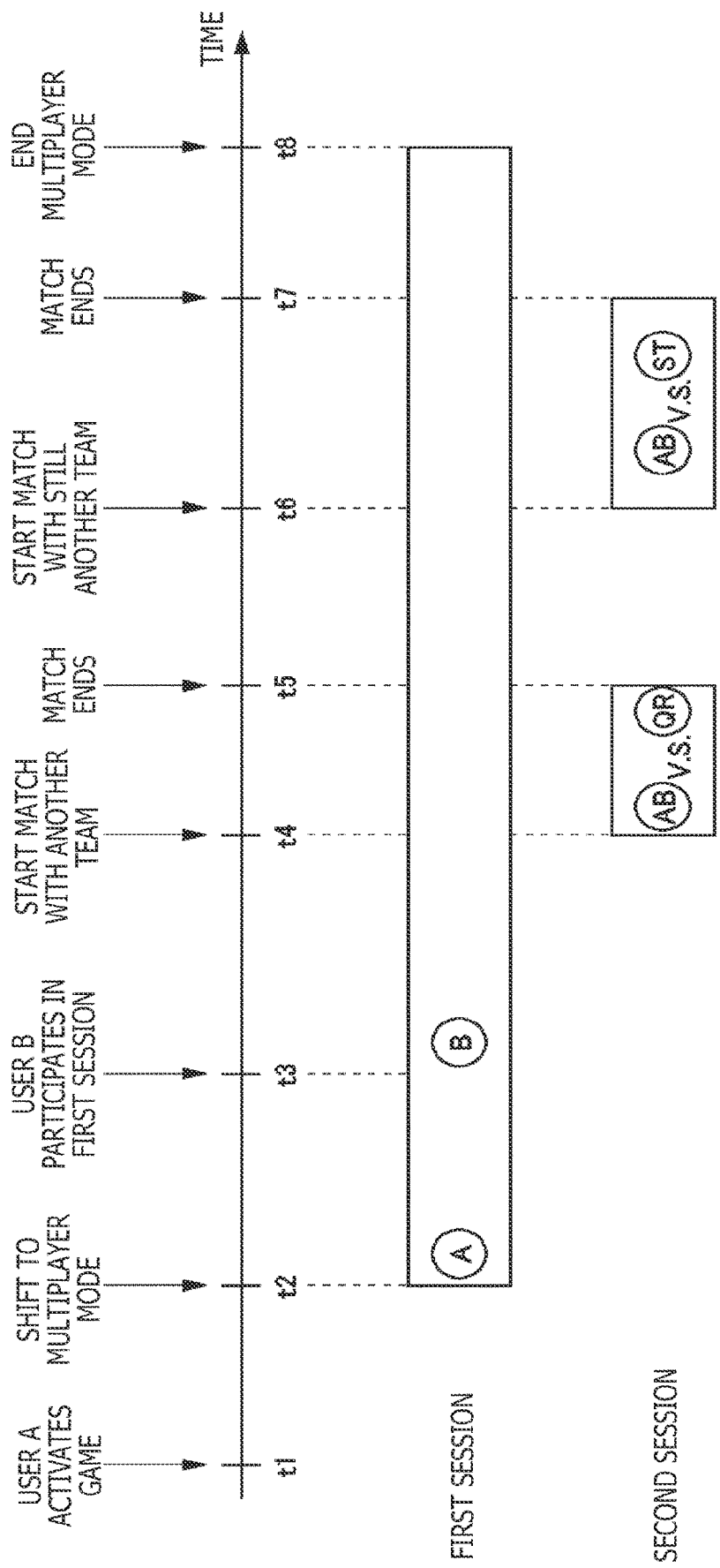
FIG. 2 depicts an explanatory diagram illustrating a session created by a game.

FIG. 2 depicts an explanatory diagram illustrating a session created by the game. The game creates at least a first session. In the embodiment, the game creates a first session and a second session. When one user (leader) creates the first session, another user is allowed to participate in the first session by accepting an invitation from the leader. After having activated the game, when the leader selects a multiplayer mode of the game, the game creates a first session on the condition that the connection environment with the network 3 is good. The first session is valid only in the multiplayer mode in which case, when the multiplayer mode ends, the first session ends automatically. Note that, in the information processing system 1, one user is allowed to participate in only one first session, but not allowed to participate simultaneously in a plurality of first sessions.

The second session is one that is created on the premise that the first session exists. A game maker may set a second session, such as a session for a game match, a session for communication in a lobby, or any other session depending on the application. The user who is invited by the leader is allowed to participate in the second session on the premise that the user is participating in the first session.

Each session is described.
(Time t1)
User A activates the game. At this point in time, the first session has yet to be created.
(Time t2)
The User A selects a multiplayer mode. At this time, the game creates a first session, and notifies the session server 6 of session information that includes the user ID of the user A, the identification information (game ID) of the game, etc. The session server 6 returns, to the game, the identification information (session ID) of the session, and manages the state of the first session. At this time, the user A is in the state of participating, as a player, in the first session.
(Time t3)
The user A invites, to the first session, user B with whom the user A wants to play together, and the user B accepts the invitation and participates in the first session.

(Time t4)
When the team of the users A and B applies for a match with another team and the application is accepted, the game creates a second session which, in turn, starts the match between the teams. Here, the match is played between the team of the users A and B and the team of users Q and R.
(Time t5)
When the match ends, the game ends the second session.
(Time t6)
Then, when the team of the users A and B applies for a match with another team and the application is accepted, the game creates a second session which, in turn, starts the match between the teams. At this time, the match is played between the team of the users A and B and the team of users S and T.
(Time t7) When the match ends, the game ends the second session.
(Time t8)
When the user A ends the multiplayer mode, the game ends the first session. Either when the game ends or when the information processing device 10 of the user A becomes off-line, the system software notifies the session server 6 of the end of the first session.

The game session disclosed in PTL 1 corresponds to the second session depicted in FIG. 2. For this reason, the duration of the session is short so that the situation may occur in which the session is lost before an invited user tries to participate in it. On the other hand, in the embodiment, the first session is created as a session that is maintained as long as the leader continues the multiplayer mode, which allows increased possibility that the invited user can participate in the first session. The game in the embodiment may be configured such that the leader is allowed to invite other users only to the first session but not to the second session. Note that, in the example illustrated in FIG. 2, although the match between the teams is performed in the second session, the match between the teams may be performed in the first session or, alternatively, both a match between participating members and a cooperative play may be performed in the first session.

The game in the embodiment supports an in-game watching mode. Therefore, in both the first session and the second session, slot for "players" who play the game and slots for "spectators" who watch the game are prepared. The upper limit value of the number of the slots for "players" means the maximum value of the players who can participate, and the upper limit value of the number of the slots for "spectators" means the maximum value of the spectators who can participate. The information processing device 10 in the embodiment provides a user interface for a user to specify whether the user participates as a player or as a spectator when the user participates in the session.

At time t2, when the user A selects the multiplayer mode, the game being executed by the information processing device 10 of the user A creates a first session and transmits, to the session server 6, the session information that includes the title of the session, the user ID of the user A, and the game ID. Upon receiving the session information, the session server 6 assigns a session ID and returns it to the game.

The session server 6 has a table, for each game ID, that holds the title of the game, an icon of the game, the upper limit value of the number of slots for "players," and the upper limit value of the number of slots for "spectators." The session server 6 recognizes the upper limit values of the slots from the received game ID. Note that the title of the game, the game icon, and the upper limit value of each slot may be included in the session information and provided from the game to the session server 6. Hereinafter, the operation in the case where the user A invites the user B to the first session will be described. The information indicating that the user A has invited the user B is notified together with the session ID to both the session server 6 and the management server 8.

Figure 3:
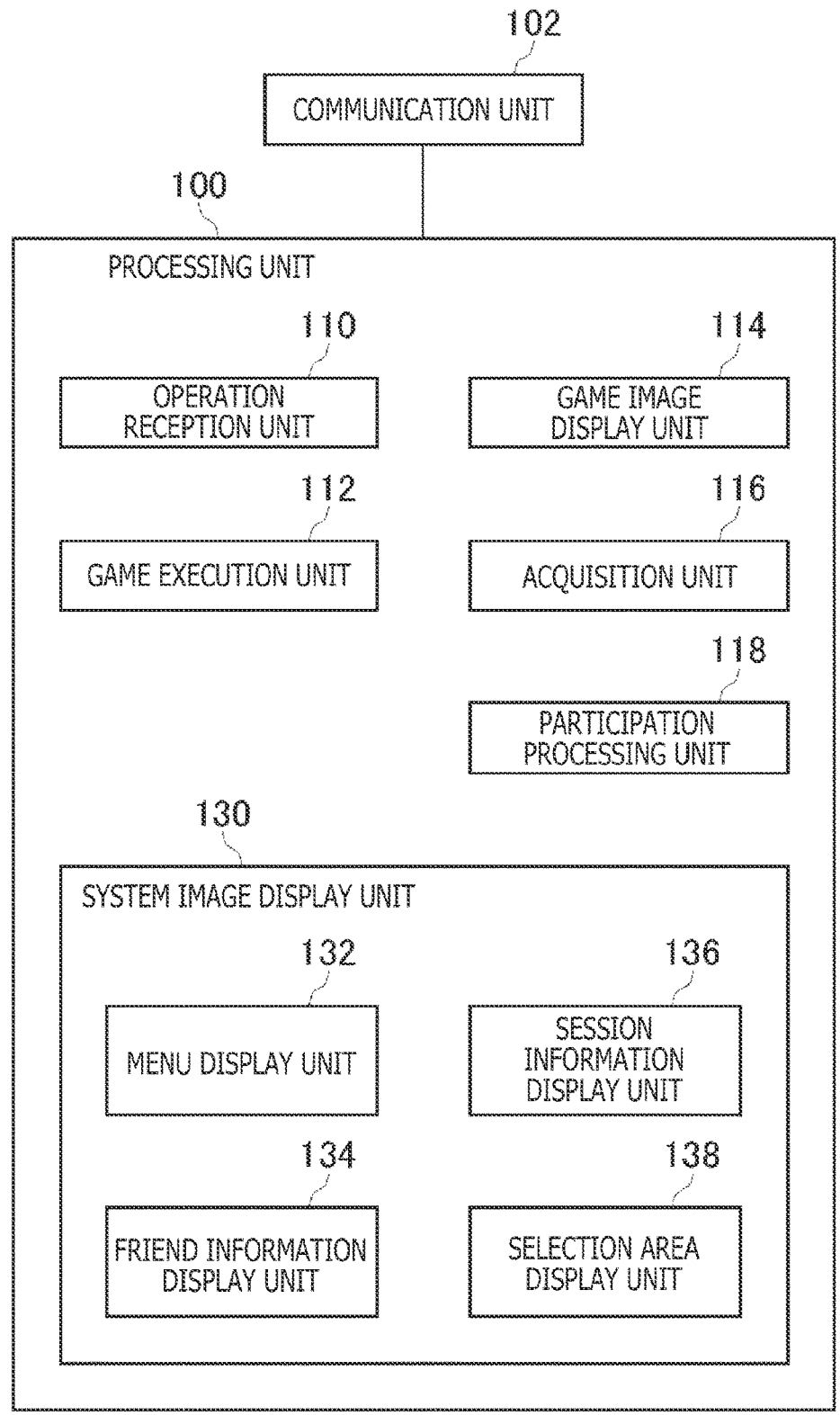
FIG. 3 depicts a diagram illustrating functional blocks of an information processing device.

FIG. 3 depicts functional blocks of the information processing device of the user B. The information processing device 10 includes a processing unit 100 and a communication unit 102. The processing unit 100 includes an operation reception unit 110, a game execution unit 112, a game image display unit 114, an acquisition unit 116, a participation processing unit 118, and a system image display unit 130. The system image display unit 130 is implemented by system software and includes a menu display unit 132, a friend information display unit 134, a session information display unit 136, and a selection area display unit 138. The system image display unit 130 generates system images. The system image display unit 130 displays an image in which a system image is superimposed onto a game image, according to an operation by the user.

In FIG. 3, each of the components depicted as functional blocks for performing various processes may include a circuit block, a memory, and another LSI (Large Scale Integration) in view of hardware, and may include system software, a game program loaded into a memory, and the like in view of software. Therefore, it will be obvious to those skilled in the art that the functional blocks may be implemented in a variety of manners by hardware only, software only, or any combination of both, without limitation to any of the manners.

The communication unit 102 receives operation information regarding the user's operation of a button and the like of an input device, and provides the operation information to the operation reception unit 110. Further, the communication unit 102 communicates with the management server 8 and the various activity servers 7, thereby receiving information regarding friends and information regarding sessions. The communication unit 102 may have both the function of a wireless communication module and the function of a wired communication module.

The operation reception unit 110 receives the operation information of the input device via the communication unit 102. In the embodiment, the game execution unit 112 executes a game program to generate image data and sound data of the game. The function of the game execution unit 112 is implemented by the system software, the game program, hardware such as a GPU (Graphics Processing Unit), or any other item. Note that the game is one example of applications, and the game execution unit 112 may execute applications other than games.

During playing the game by the user, the operation reception unit 110 supplies the operation information of the input device to the game execution unit 112. The game execution unit 112 performs arithmetic processing for moving a player character in a virtual space on the basis of the operation information. The game execution unit 112 includes a GPU for executing rendering processing and the like. Upon receiving the result of the arithmetic processing in the virtual space, the game execution unit 112 generates game image data and game sound data from a viewpoint position (virtual camera) in the virtual space. The game image display unit 114 causes a display to display the game image, and a sound providing unit (not illustrated) causes a loudspeaker to output the sound of the game. The information processing device 10 may be connected to a television receiver equipped with a display and a loudspeaker in which case the television receiver outputs the image and sound of the game.

Figure 4:
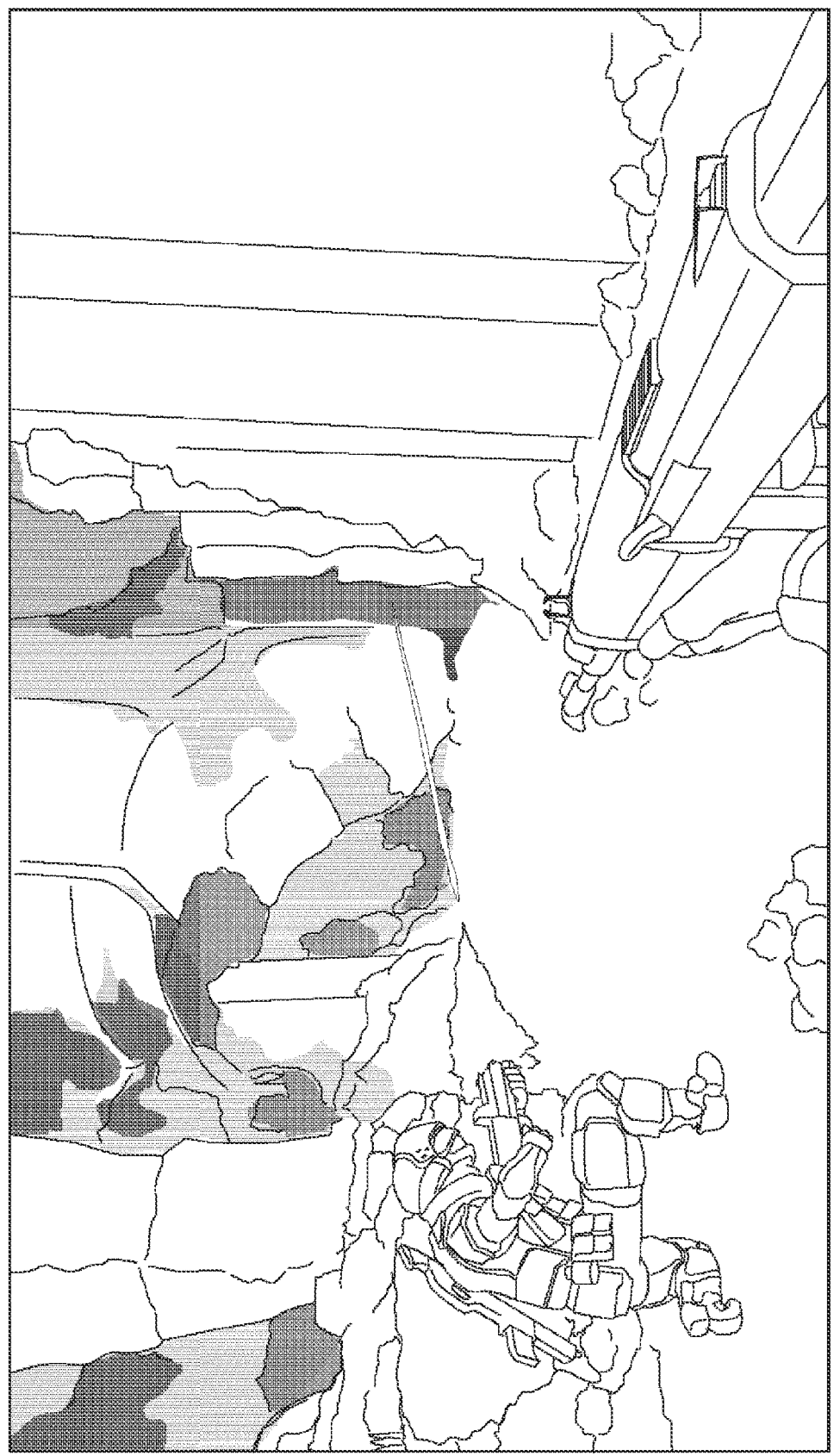
FIG. 4 depicts a diagram illustrating an example of a game screen.

FIG. 4 depicts an example of the game screen on which the user B is playing. The user B operates the input device so as to play the game while viewing the game image and listening to the sound of the game. During playing the game, when the user B shortly presses a predetermined button of the input device, the operation reception unit 110 receives the operation of the short pressing of the predetermined button.

The operation reception unit 110 supplies, to the system image display unit 130, the operation information regarding the short pressing of the predetermined button, with the short pressing being received during performing the game. In the system image display unit 130, the menu display unit 132 superimposes, onto the game image, and displays a system image including a plurality of menu items. The superimposing and displaying of the system image on the game image causes the operation reception unit 110 to start to supply operation information to be received after this to the system software.

Figure 5:
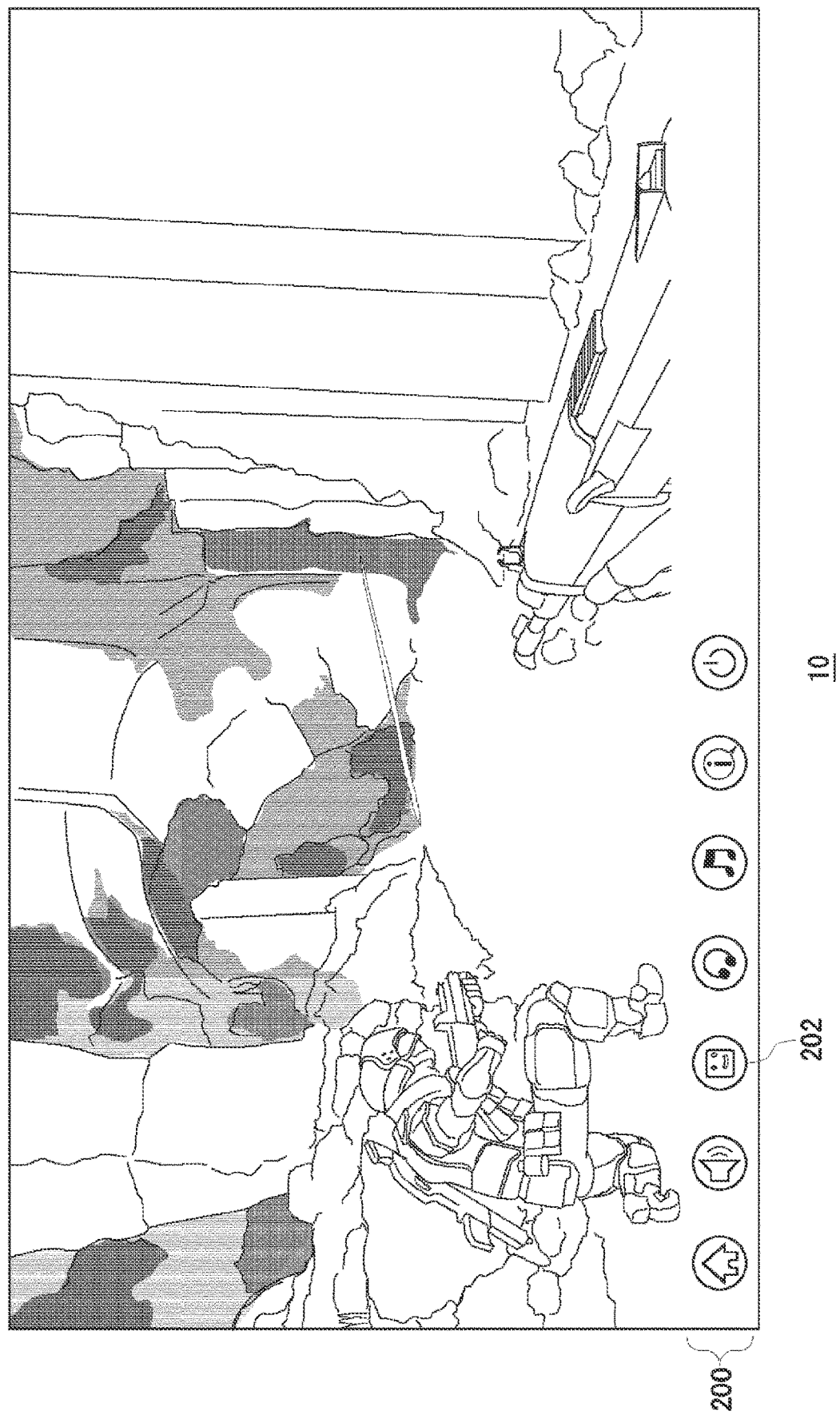
FIG. 5 depicts a diagram illustrating an example of displaying an image in which a system image is superimposed onto a game image.

FIG. 5 depicts an example of a display in which a system image including menu icons is superimposed, onto a game image, and displayed. The menu display unit 132 sets a functional icon selection area 200 in a lower portion of the display screen, and arranges a plurality of menu icons in the area. By selecting a menu icon from them, the user B can perform the system function associated with the icon. Here, the user B selects a friend icon 202.

Upon receipt, by the operation reception unit 110, of the operation information regarding the selection of the friend icon 202, the friend information display unit 134 superimposes, onto the game image, and displays a system image that includes the information regarding friends of the user B.

Figure 6:
FIG. 6 depicts a diagram illustrating an example of a friend window.

FIG. 6 depicts an example of a friend window 210. The friend information display unit 134 superimposes, onto the game image, and displays the friend window 210 that includes names of on-line users A, C, D, and E and the title of the game being played. The information regarding the friends is acquired from the management server 8 by the acquisition unit 116. The acquisition unit 116 may acquire the information regarding the friends at regular intervals or, alternatively, may acquire it from the management server 8 when the status of the friends changes in the management server 8. In the information processing device 10, the information regarding the friends is preferably maintained in the latest state. By looking at the friend window 210, the user B can confirm the on-line friends and also confirm the game title of the game being currently played.

The friend window 210 includes a selection frame 212. The user B moves the selection frame 212 to select one friend. Here, the display area of the user A includes the information ("Now Inviting") indicating that the user A is currently inviting the user B to the session. When the user B places the selection frame 212 over the display area of the user A and then operates a determination button of the input device, the operation reception unit 110 receives the operation information. Then the friend information display unit 134 displays a detail window that includes detailed information of the user A, on the right of the friend window 210.

Figure 7:
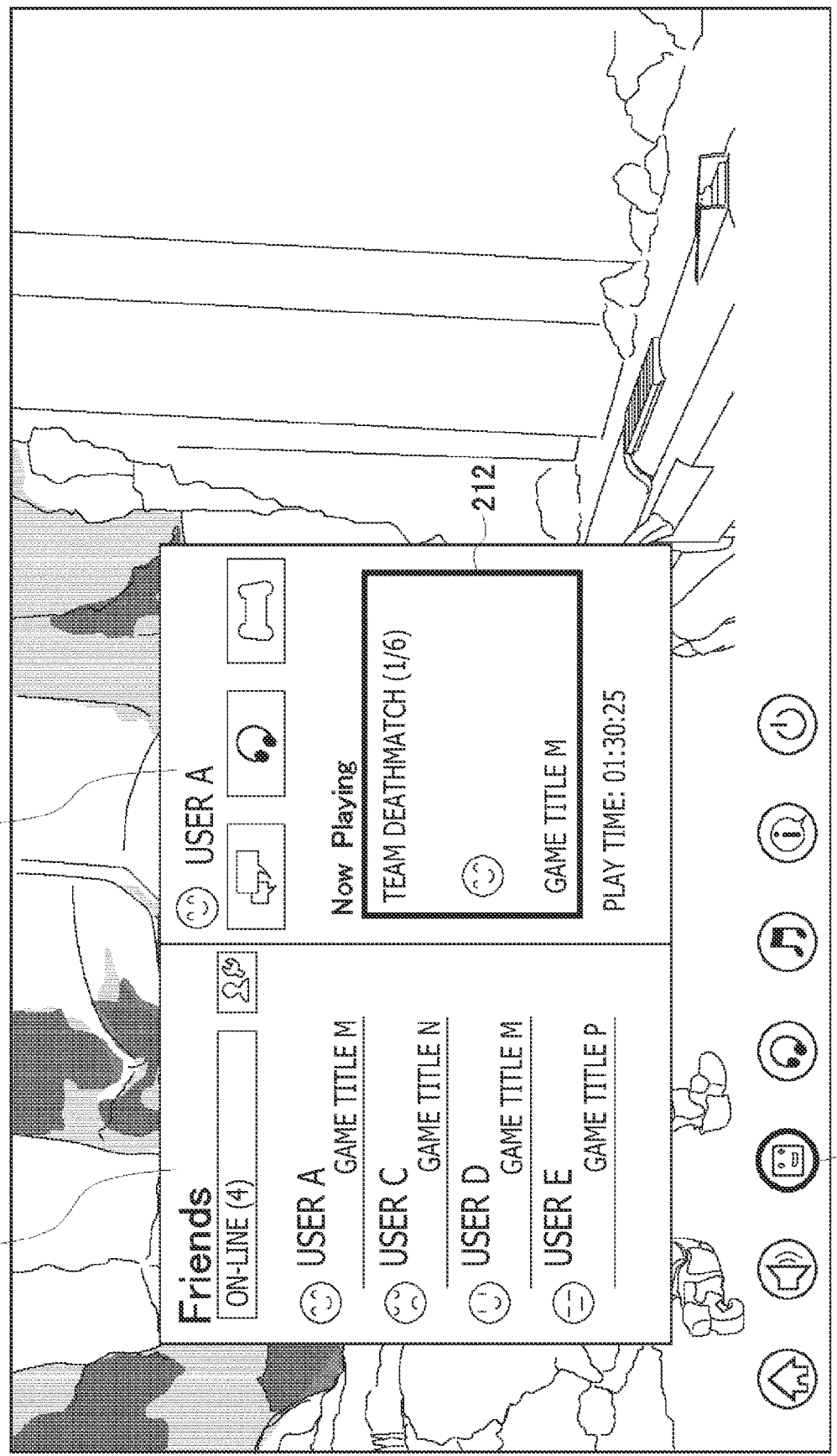
FIG. 7 depicts a diagram illustrating an example of a detail window of a friend.

FIG. 7 depicts an example of a detail window 214 of friends. The friend information display unit 134 superimposes, onto the game image, and displays the detail window 214 including the detailed information of the selected user A. The acquisition unit 116 acquires information regarding the game and session of the user A from the management server 8 and the session server 6, and then the friend information display unit 134 displays the information in the detail window 214. Note that the acquisition unit 116 may acquire the status of winning trophies of the user A from the trophy server 4, and then the friend information display unit 134 may display the status in the detail window 214.

In the detail window 214 depicted in FIG. 7, the session information regarding the name of the session, the icon of the user participating in this session, play time, etc., is displayed. Note that, during between t2 and t3 depicted in FIG. 2, since only the user A is participating in the session, only the icon of the user A is displayed. When the user B places the selection frame 212 over the display area of the session information and then operates the determination button of the input device, the operation reception unit 110 receives the operation information and the session information display unit 136 superimposes, onto the game image, and displays a session window that includes information regarding the session of the user A. The session window may be displayed on the right of the detail window 214.

Figure 8:
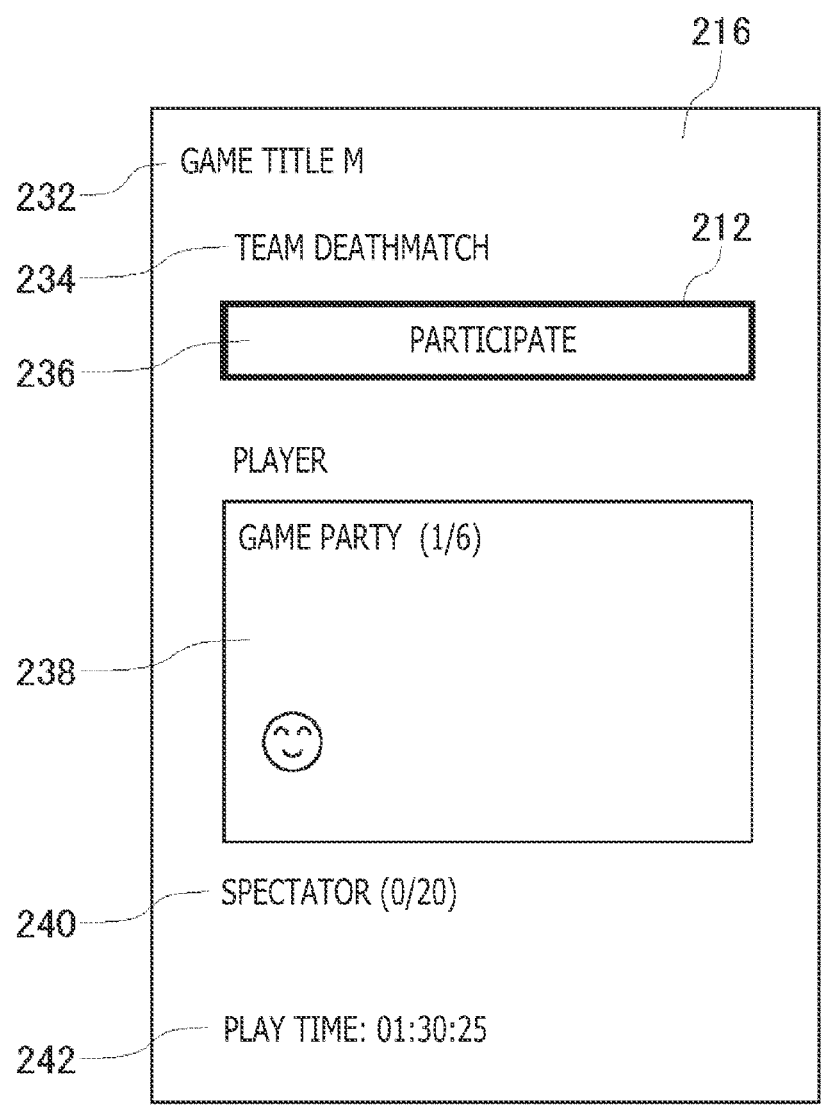
FIG. 8 depicts a diagram illustrating an example of a session window.

FIG. 8 depicts an example of the session window 216. The session information display unit 136 superimposes, onto the game image, and displays the session window 216 that includes information regarding the first session of the user A. The acquisition unit 116 acquires detailed information regarding the session of the user A from the session server 6, and then the session information display unit 136 displays the detailed information in the session window 216.

In the session window 216, a title display area 232, a session name display area 234, a participation button 236, a player display area 238, a spectator number display area 240, and a play time display area 242 are set in this order from the top. The game title is displayed in the title display area 232, and the session name is displayed in the session name display area 234. The participation button 236 is a GUI (Graphical User Interface) for the user B to participate in the session of the user A. When the determination button of the input device is operated in the state of the selection frame 212 being placed over the participation button 236, the user B is allowed to participate in the session.

In the player display area 238, information regarding users who are participating in the session as players is displayed. In the example depicted in FIG. 8, the information as to that the upper limit number of players is six and that one player (user A) is participating as a player, and the icon of the participating player are displayed.

In the spectator number display area 240, information regarding users who are participating in the session as spectators is displayed. In the example depicted in FIG. 8, the information as to that the upper limit number of spectators is 20 and that nobody is participating as a spectator yet is indicated.

When the user B places the selection frame 212 over the participation button 236 and then operates the determination button of the input device, the selection area display unit 138 displays both the area for selection of participating in the session as a spectator and the area for selection of participating in the session as a player.

Figure 9:
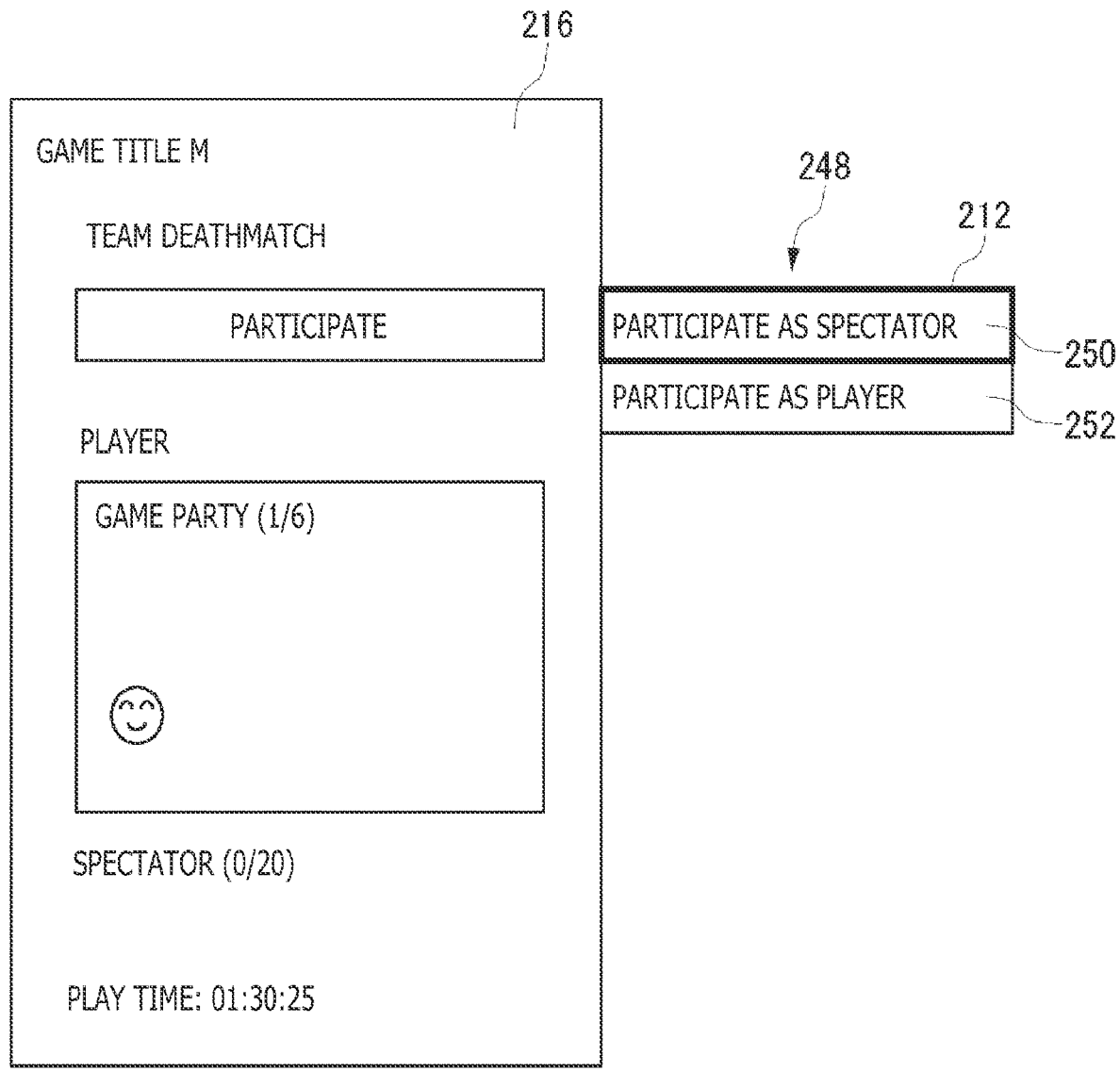
FIG. 9 depicts a diagram illustrating an example of an item column being displayed.

FIG. 9 depicts an example of an item column 248 that is displayed upon operating the participation button 236. When the participation button 236 is operated, the selection area display unit 138 displays the item column 248 that includes both the area (first selection area 250) for selection of participating in the session for a multiplayer game as a spectator and the area (second selection area 252) for selection of participating in the session for a multiplayer game as a player. When wishing to participate as a spectator, the user B selects the first selection area 250. On the other hand, when wishing to participate as a player, the user B selects the second selection area 252. The participation processing unit 118 transmits, to the session server 6, the information regarding the selection of the selection area together with the session ID, which thereby allows the user B to participate in the session of the user A. Note that the procedure for the user B to be finally allowed to participate in the session may be as follows: The user A, being the leader, accepts the participation and the game of the user A notifies the session server 6 of the participation of the user B.

In this way, in the information processing device 10 of the embodiment, it is the system software, not the game, that presents the session information including the current state to the user B. Therefore, the user B can decide participation in the game through a common user interface that does not depend on the game. Moreover, in the item column 248, choices of modes of participation in the game are displayed, which thereby allows the user B to select the participation as a spectator when not wishing to participate as a player.

Figure 10:
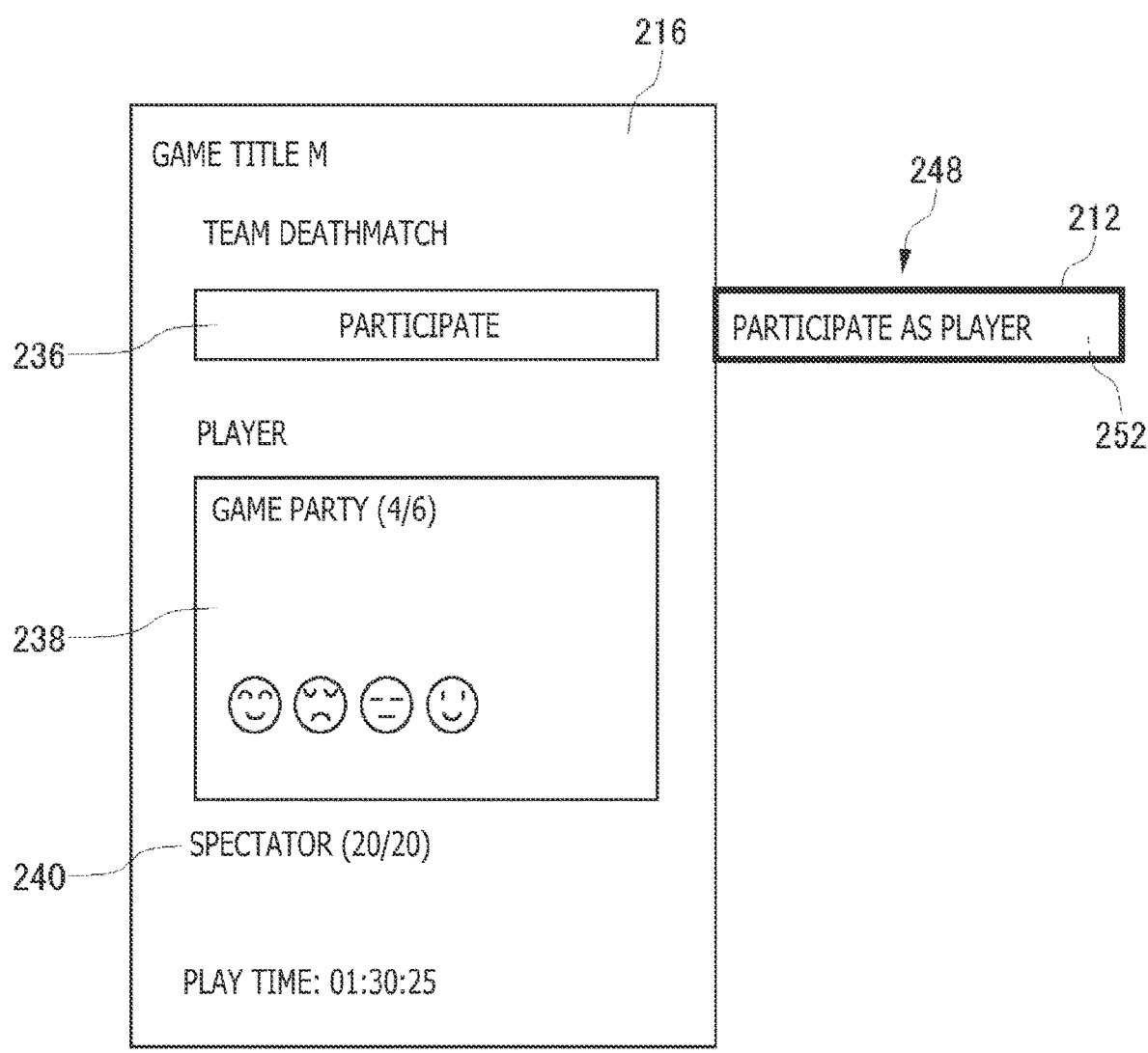
FIG. 10 depicts a diagram illustrating another example of the item column being displayed.

FIG. 10 depicts another example of the item column 248, which is displayed upon operating the participation button 236. The player display area 238 indicates that four persons are participating, as players, in the session having the upper limit number of players being six, and the spectator number display area 240 indicates that 20 persons are participating, as spectators, in the session having the upper limit number of spectators being 20. Therefore, in this session, there are two open slots for player's session while no open slot for a spectator. For this reason, in the item column 248, which is displayed upon operation of the participation button 236, only the second selection area 252 for selection of participating as a player is displayed while the first selection area 250 for participating as a spectator is not displayed.

In this way, the selection area display unit 138 displays the first selection area 250 for participating as a spectator in the case with open slots for spectators of the session, but does not display the first selection area 250 in the case without any open slot for a spectator. Like this, the selection area display unit 138 displays the second selection area 252 for participating as a player in the case with open slots for players of the session, but does not display the second selection area 252 in the case without any open slot for a player.

As described above, in the information processing system 1, the session server 6 acquires the latest information regarding the session of the game, which enables the information regarding the session to be presented to the information processing device 10 of a user who is going to participate in the session. In the information processing device 10, the state of the session is processed with the system software, which enables the session window 216 to be presented to the user via a common interface regardless of the type of game.

Hereinabove, the present disclosure has been described on the basis of the embodiments. These embodiments are intended to be illustrative only, and it will be obvious to those skilled in the art that various modifications may be made in combinations of the constituting elements and the processing processes and that such modifications are also within the scope of the present disclosure.

INDUSTRIAL APPLICABILITY

The present disclosure is applicable to the technical field of superimposing system images generated by system software onto game images.

REFERENCE SIGNS LIST

1: Information processing system
6: Session server
8: Management server
10: Information processing device
100: Processing unit
102: Communication unit
110: Operation reception unit
112: Game execution unit
114: Game image display unit
116: Acquisition unit
118: Participation processing unit
130: System image display unit
132: Menu display unit
134: Friend information display unit
136: Session information display unit
138: Selection area display unit

The invention claimed is:

1. An information processing device comprising:
a game image display unit configured to display a game image; and
a system image display unit configured to superimpose, onto the game image, and display a system image according to an operation by a user, wherein
the system image display unit includes a selection area display unit configured to display an area, with respect to a session for a multiplayer game, for selecting among a plurality of options, one option being to participate in the session as a player playing the game and another option being to participate in the session as a spectator viewing the game and not playing the game.

2. The information processing device according to claim 1, wherein, in a case where a slot for a spectator of the session is open, the selection area display unit displays a selection area for participating in the session as the spectator.

3. The information processing device according to claim 1, wherein the selection area display unit displays an area for selection of participating in the session as a player.

4. The information processing device according to claim 3, wherein, in a case where a slot for a player of the session is open, the selection area display unit displays a selection area for participating in the session as the player.

5. An image display method for superimposing, onto a game image, and displaying another image, the method comprising:
displaying the game image;
superimposing, onto the game image, and displaying a window including information regarding a session for a multiplayer game; and
displaying an area, with respect to the session, for selecting among a plurality of options, one option being to participate in the session as a player playing the game and another option being to participate in the session as a spectator viewing the game and not playing the game.

6. A non-transitory, computer readable storage medium containing a program, which when executed by a computer, causes the computer to perform an image display method by carrying out actions, comprising:
displaying a game image;
superimposing, onto the game image, and displaying a window including information regarding a session for a multiplayer game; and
displaying an area, with respect to the session, for selecting among a plurality of options, one option being to participate in the session as a player playing the game and another option being to participate in the session as a spectator viewing the game and not playing the game.

* * * * *